(No Model.)  5 Sheets—Sheet 1.
F. R. PACKHAM.
SEEDING MACHINE.
No. 530,962.  Patented Dec. 18, 1894.
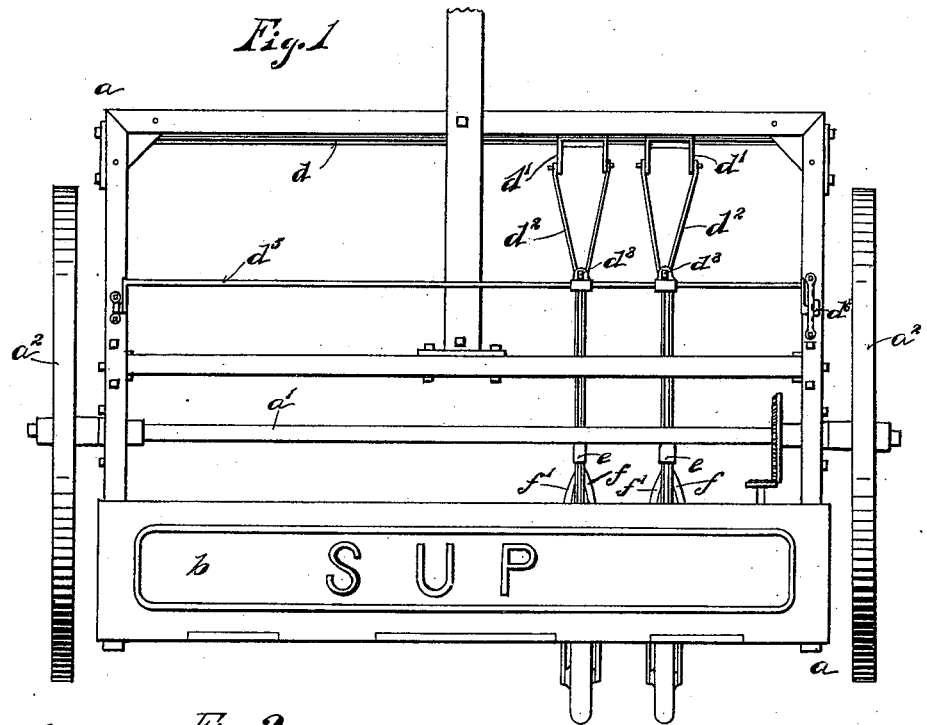
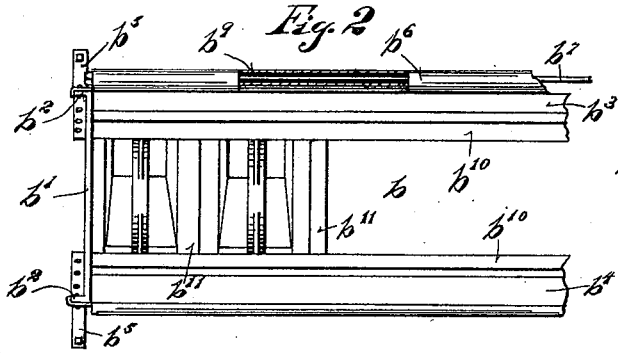
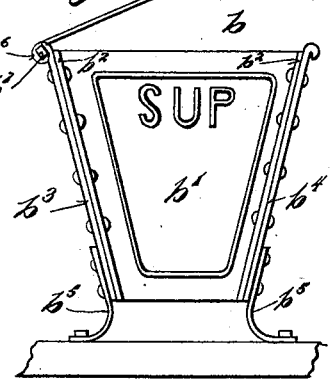
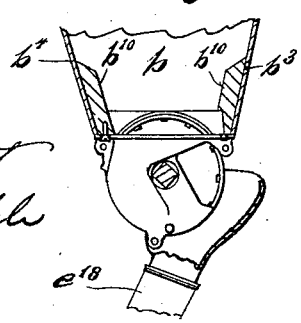
WITNESSES:
Fred B. Ernst
Chas. J. Welch
INVENTOR
Frank R. Packham
BY
Staley & Shepherd
ATTORNEYS (No Model.) 5 Sheets—Sheet 2.
F. R. PACKHAM.
SEEDING MACHINE.
No. 530,962. Patented Dec. 18, 1894.
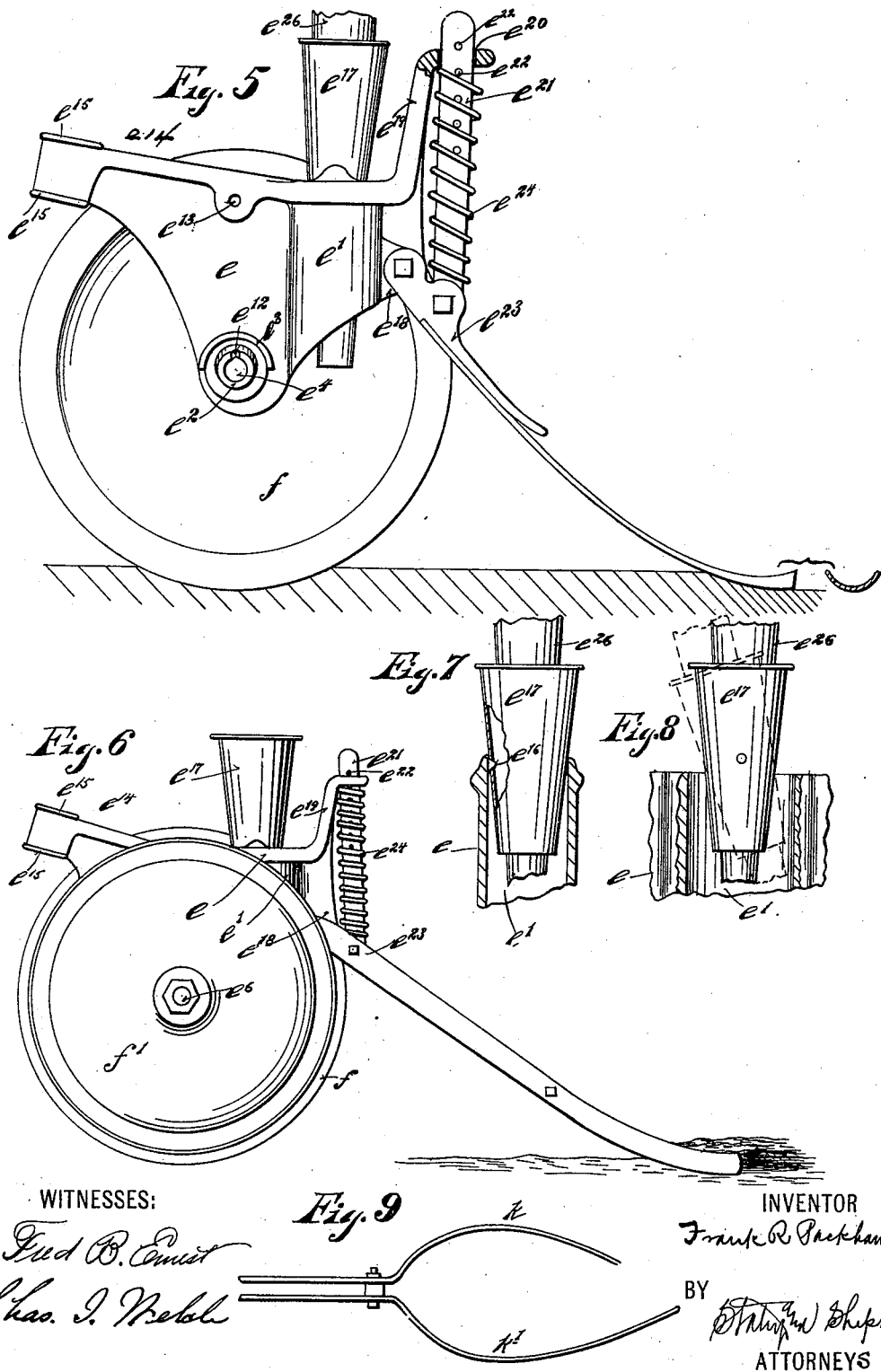

(No Model.) 5 Sheets—Sheet 3.

F. R. PACKHAM.
SEEDING MACHINE.

No. 530,962. Patented Dec. 18, 1894.

WITNESSES:
Fred B. Ernest
Chas. I. Welch

INVENTOR
Frank R. Packham
BY
Statrop & Shepherd
ATTORNEYS (No Model.) 5 Sheets—Sheet 4.
F. R. PACKHAM.
SEEDING MACHINE.
No. 530,962. Patented Dec. 18, 1894.
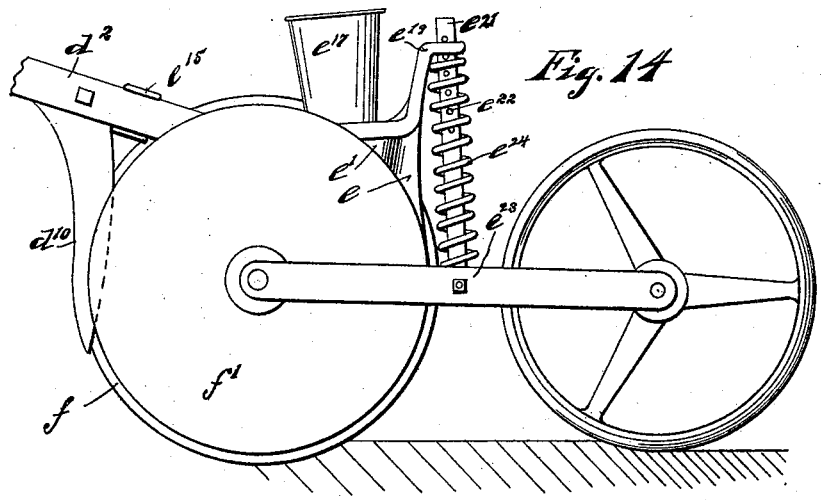
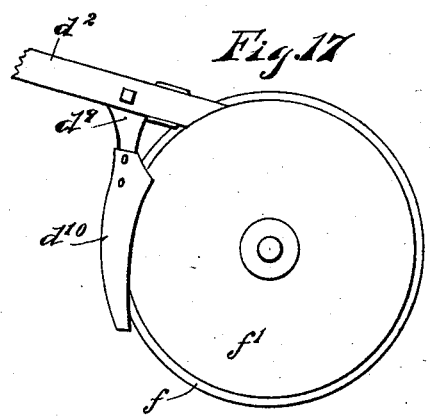
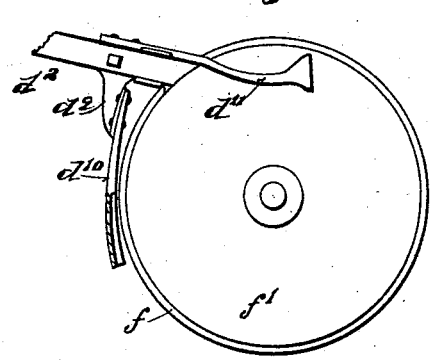
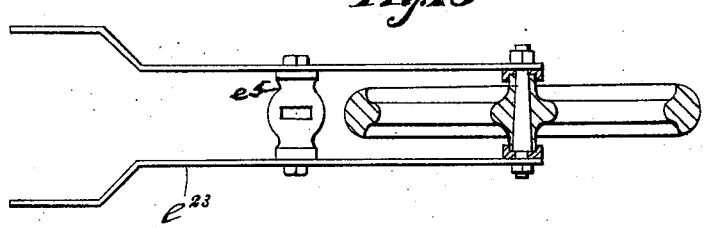
WITNESSES:
INVENTOR
Frank R. Packham
BY
ATTORNEYS (No Model.) 5 Sheets—Sheet 5.
F. R. PACKHAM.
SEEDING MACHINE.
No. 530,962. Patented Dec. 18, 1894.
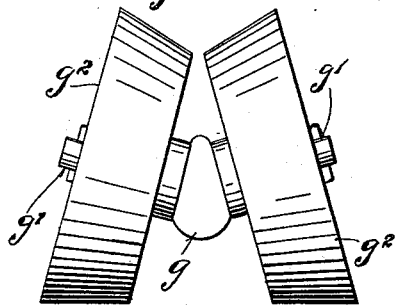
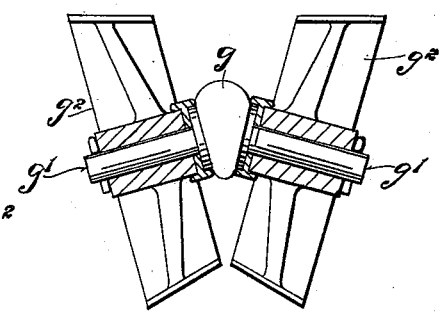
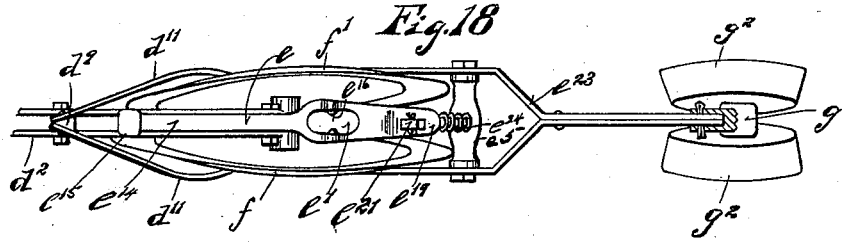
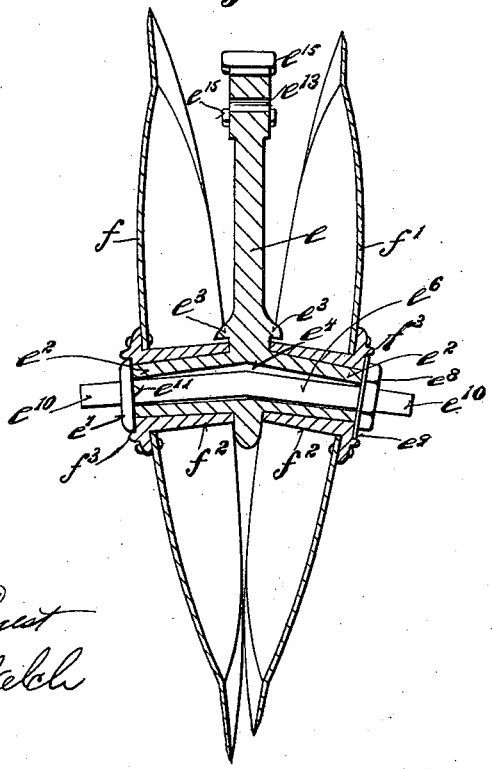
WITNESSES:
Fred B. Ernest
Chas. J. Welch
INVENTOR
Frank R. Packham
BY
Staley and Shepherd
ATTORNEYS

UNITED STATES PATENT OFFICE.

FRANK R. PACKHAM, OF SPRINGFIELD, OHIO, ASSIGNOR TO THE SUPERIOR DRILL COMPANY, OF SAME PLACE.

SEEDING-MACHINE.

SPECIFICATION forming part of Letters Patent No. 530,962, dated December 18, 1894.

Application filed April 9, 1894. Serial No. 506,819. (No model.)

*To all whom it may concern:*

Be it known that I, FRANK R. PACKHAM, a citizen of the United States, residing at Springfield, in the county of Clark and State of Ohio, have invented certain new and useful Improvements in Seeding-Machines, of which the following is a specification.

My invention relates to improvements in seeding machines and the object of my invention is to provide a novel arrangement and construction of the seeding devices and the hoppers supporting or containing the same.

A further object of my invention is to provide a novel construction in the devices for opening the furrows and depositing the seed therein.

A further object of my invention is to provide a novel arrangement of the covering devices in connection with the furrow openers.

A further object of my invention is to provide a novel arrangement of parts for adjusting the depth of planting.

A further object of my invention is to simplify and cheapen the construction of the various parts of seeding devices as heretofore employed.

I attain these objects by the use of the constructions shown in the accompanying drawings, in which—

Figure 10:
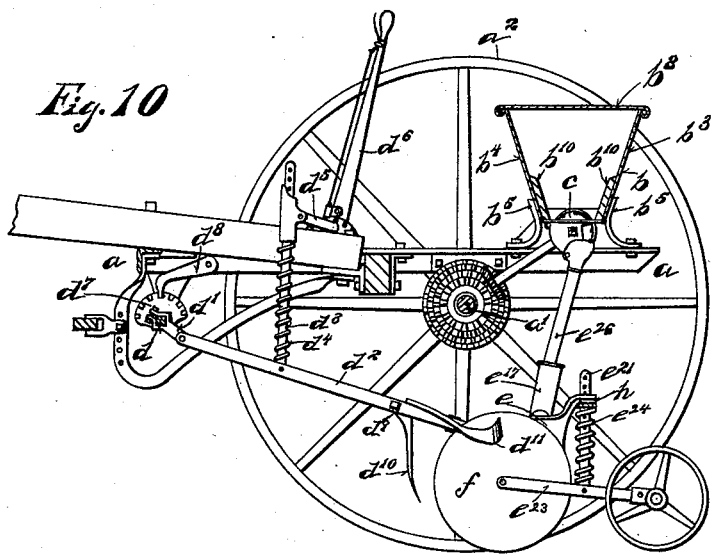
Figure 11:
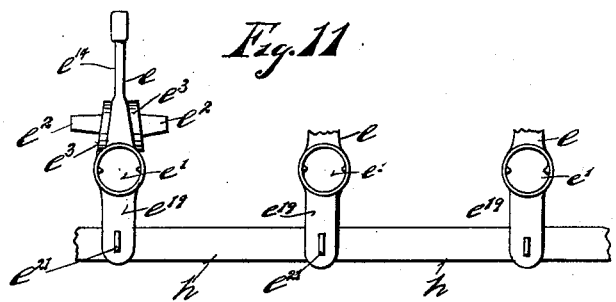
Figure 13:
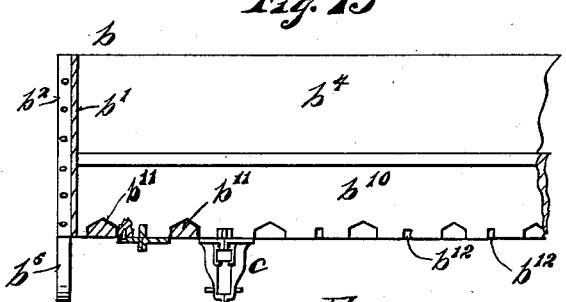
Figure 12:
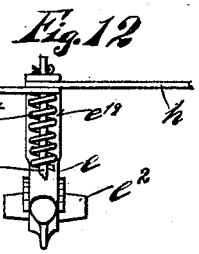

Figure 1 is a plan view of a device embodying my invention. Fig. 2 is a partial plan view of the seed hopper, some of the parts being shown in section. Fig. 3 is an end view, and Fig. 4 a partial sectional view of the same. Fig. 5 is a side elevation, partly in section, of my improved furrow opening devices, with one of the disks removed therefrom. Fig. 6 is a side elevation of the same, showing a modification. Figs. 7 and 8 are detail views of a portion of the same. Fig. 9 is a detail of a modified form of covering device. Fig. 10 is a sectional elevation of my improved machine. Fig. 11 is a plan view of a portion of the furrow opening devices, showing the method of connecting the same together. Fig. 12 is a rear elevation of the same. Fig. 13 is a longitudinal sectional view of a portion of the hopper. Fig. 14 is a side elevation of the furrow opening devices with the covering wheel attached. Fig. 15 is a plan view of a portion of the same. Figs. 16 and 17 are side elevations of a portion of the same showing modifications in the guards or shields thereof. Figs. 18, 19 and 20 are detail views of an improved form of adjustable covering and supporting devices for use in connection with the furrow opener. Fig. 21 is a sectional view of the furrow opener.

Like parts are represented by similar letters of reference in the several views.

In the said drawings, $a\ a$ represents the main frame, which is preferably constructed of angle iron or steel and is supported on a main axle $a'$, on which at each end are mounted carrying wheels $a^2\ a^2$, from which the power to drive the seeding devices is obtained in the usual manner.

$b$ represents my improved form of seed hopper, which is entirely formed of metal, preferably of steel, the sides and top being formed of sheet metal, with panels or raised portions, which are struck up by means of suitable dies so as to stiffen and strengthen the same; the parts being further preferably stiffened and strengthened by pressing from the metal suitable letters or figures descriptive of the character of the machine. The end pieces $b'$ are further provided with upturned flanges $b^2$, to which the side pieces $b^3$ $b^4$ are riveted or otherwise secured; suitable supporting legs $b^5$ being also riveted or otherwise secured to said flanges by which the hopper is supported. One of the side pieces $b^3$ is projected upwardly at suitable intervals at the top and is bent or curved into a cylindrical form so as to constitute a barrel or cylinder $b^6$, adapted to receive a rod $b^7$, which passes through all of said barrels or cylinders. The lid $b^8$ is similarly formed with cylindrical bearings $b^9$, adapted to fit between the barrels or cylinders $b^6$ so as to stand coincident therewith and receive the rod $b^7$, which passes entirely through the same, thus hinging the lid to the hopper proper.

Located within the hopper and secured to the sides thereof near the bottom are two supporting strips $b^{10}$ of wood, or of similar soft material. These supporting strips are connected together at suitable intervals by blocks $b^{11}$, adapted to form bridges between the respective distributing devices $c$. The strips $b^{10}$ are further provided at the bottom with guides $b^{12}$, adapted to receive projecting portions of the distributers, which serve as guides to bring said distributers in their proper locations, the distributers being secured in position by screws or other suitable fastening devices, which enter the supporting strips $b^{10}$. Means are thus provided by which the distributing devices may be readily secured in their proper positions at the bottom of the hopper, while the hopper, or all the outer portions thereof, is constructed entirely of metal.

Located at the front and below the frame $a$ $a$ is a shaft $d$, preferably formed square in cross section and provided at suitable intervals with projecting fingers $d'$ to which are attached the drag bars $d^2$. These drag bars $d^2$ may be provided with the usual lifting stirrups $d^3$, having springs $d^4$ thereon, adapted to be operated through the medium of a rock shaft $d^5$ and a hand lever $d^6$ in the manner described in my prior Patent No. 429,320, dated June 3, 1890, to raise or lower the drag bars and to exert a yielding pressure thereon. Each of these drag bars is connected at its rear end to and carries a supporting head $e$, having formed therein a conduit $e'$, extending entirely through the same and provided on each side with angularly-projecting bosses or trunnions $e^2$. It is further provided above and slightly removed from said bosses or trunnions with a curved or semi-circular cap or cover $e^3$. The trunnions $e^2$ are hollow, they being in fact formed in the nature of sleeves with an opening $e^4$ extending entirely through the supporting head and through the said trunnions, said openings being curved or in other words extending in different directions from the center to correspond to the angle of the trunnions.

Journaled on the respective trunnions are disks $f f'$; each of which is preferably formed of steel riveted or otherwise secured to a central hub $f^2$; the general form of the disk being concavo-convex, with the outer periphery, however, formed straight. These disks are preferably of different sizes, that is, the disk $f'$ is slightly smaller than the disk $f$, and the angularity of the trunnions is such that the straight portions of the respective disks meet at a point slightly in advance and below the center of the respective trunnions; the edge of one disk being slightly back of the edge of the other. The hub of each disk is preferably provided at the outer end with a circular flange $f^3$, which projects therefrom, and the disks are held in place by means of a rod or bolt $e^6$, having at one end a suitable head $e^7$, and at the other screw threaded and provided with a nut $e^8$ and a suitable washer $e^9$. This connecting rod or bolt is further provided at each end with projections $e^{10}$, preferably slightly smaller in diameter than the main portion and adapted to receive the end of a pivoted hanger to support a covering or supporting wheel in the manner hereinafter more fully described. The head $e^7$ of the bolt $e^6$ is preferably formed with a small engaging projection $e^{11}$, adapted to engage in a similarly constructed notch $e^{12}$ in one of the trunnions to prevent the same from turning. The opening $e^4$ is made slightly larger in diameter at the center than at the ends so that the bolt or connecting rod $e^6$, which is curved to conform to the curvature of said opening, may be inserted into the same, and when in place is held in the proper position by means of the engaging projection $e^{11}$ engaging in the notch $e^{12}$; the head, washer and bolt being adapted to hold the disks firmly in their positions, the hubs of the disks being slightly shorter than the respective trunnions on which they revolve so that the parts of the bolts may be drawn up tightly without binding the hubs of said disks. The angular flanges $f^3$ of the respective hubs serve as caps to prevent dirt or other foreign substance from working into the hubs of the respective disks; the curved flanges $e^3$ serving a similar purpose on the opposite side of said hubs.

The respective drag bars are connected to the supporting heads $e$ by means of a suitable bolt or pin which extends through an opening $e^{13}$; the head being provided with a forwardly-extending arm $e^{14}$, having laterally-projecting flanges $e^{15}$, adapted to engage on each side of the drag bar and thus firmly connect the same to the head through the agency of the single bolt or pin which passes through the opening $e^{13}$.

The conduit $e'$ is provided at the top with small inwardly projecting trunnions $e^{16}$, and into this conduit is adapted to be placed a pivoted sleeve $e^{17}$, said sleeve being preferably constructed of sheet metal and having openings in the sides thereof adapted to fit over the trunnions $e^{16}$, the sheet metal being formed with a certain amount of resilience which will permit the sides of said sleeve to be forced inwardly as the sleeve is pressed into the mouth of the conduit until the trunnions enter the openings in the sides thereof, when the sides will spring out and cause the trunnions to be engaged in the openings and thus hold the parts securely together and at the same time permit a limited movement of the sleeve about said trunnions.

A connection is formed from the seed distributers through the hinged sleeve $e^{17}$ and the conduit $e'$ in the usual manner by means of a flexible tube $e^{26}$, which is adapted to discharge the seed between the disks $f$ and $f'$ at a point in the rear of the trunnions and where the said disks are removed from each other. To provide for covering the seed thus dropped into the furrow formed by the disks, as described, and to adapt the devices to different characters of soil, I construct in the rear of the conduit a flange or lug $e^{18}$, and extend upwardly and backwardly therefrom a curved arm $e^{19}$, the upward backwardly-extending portion of which is provided with an opening $e^{20}$ to receive an adjustable rod or bar $e^{21}$. This bar $e^{21}$ is provided with a series of openings $e^{22}$, which are arranged at a distance apart equal to the thickness of the arm $e^{19}$ where it is perforated by the opening $e^{20}$, so that by placing a pin or other suitable projection into the respective openings on each side of said arm the bar $e^{21}$ may be held rigidly against movement in either direction. The bar $e^{21}$ is pivoted at its opposite end to a hinged hanger or support $e^{23}$, which carries a covering or pressing device. This hanger or support $e^{23}$ may be hinged to the lug $e^{18}$, as shown in Figs. 5 and 6, or may be hinged to the ends of the connecting bolt $e^5$, as shown in Figs. 14, 15 and 18. In either case the bar $e^{21}$ serves to adjust the hanger or support and thus adjust the covering devices. A spring $e^{24}$ is placed around the bar $e^{21}$ so as to exert, when desired, a yielding pressure on said support. The tension of this spring may be adjusted by means of the openings $e^{22}$, which permit a change in the point of attachment for the spring to said bar and thus shorten or lengthen the distance between said point of attachment and the arm $e^{19}$, against which the opposite end of the spring rests when a yielding pressure is to be exerted on the support or hanger. When the covering device is to be connected unyieldingly to the furrow opening device, then suitable pins are placed in the openings on opposite sides of the arm $e^{19}$, at the proper point desired.

In Figs. 18 to 20, inclusive, I have shown an improved form of covering device. This consists essentially of a bearing head $g$, adapted to be secured on the end of a suitable hanger $e^{23}$, and provided with angularly-arranged studs or trunnions $g'$ $g'$ on which are mounted covering wheels $g^2$, formed with a beveled or cone-shaped periphery. The angle of the periphery of the respective wheel is so formed that when placed on the angularly-arranged studs or trunnions, the tops or bottoms, as the case may be, of said wheels shall stand horizontal and in line with each other. The bearing head $g$ is made detachable and reversible on the hanger $e^{23}$, so that by reversing said head the straight portion of said wheels may be brought at the top or bottom, as desired. When placed at the bottom, as shown in Fig. 19, the peripheries of the wheels rest upon the ground in a substantially horizontal plane and are considerably removed from each other so as to rest on the ground at the side of the furrow instead of directly over it. When the bearing head is reversed the peripheries of the wheels stand at an angle to each other and to the surface of the ground, and are closed together substantially over the furrow so as to cover the said furrow and form a ledge above the same with a slight depression at either side thereof. This adjustable feature is of considerable importance in planting different seeds in different characters of soil, as by its use the soil may be packed firmly over the seed or left loose as desired.

In planting seeds of certain character a very fine adjustment in depth is desirable. By the constructions just described, when my improved covering wheels are employed, or when a simple supporting or gage wheel, as shown in Figs. 14 and 15, is employed, the depth of the disk furrow opener in relation to the surface of the ground may be more or less accurately adjusted by means of the openings in the adjustable bar $e^{21}$. To provide, however, for a finer and more perfect adjustment, I construct the bar $d$, carrying the fingers $d'$, with a segment $d^7$ (Fig. 10), having a series of notches with which the pivoted lever $d^8$ is adapted to engage. This bar is supported at either end in bearings which permit it to be rotated. Now, by raising the latch $d^8$ and turning the bar $d$ with a wrench or otherwise so as to bring the successive notches of the segment $d^7$ opposite the latch $d^8$, the other ends of the drag bars $d^2$ may be raised or lowered, as desired, and this, in connection with the rigidly-connected gage wheel, which extends some distance back of the furrow opening device, insures the most accurate gaging in the depth of planting.

In operating rotating disk furrow openers, as before described, when the said disks are arranged at an angle the entrance of foreign substances between the disks above the point at which they contact frequently results seriously, as the disks are at this point gradually approaching each other and any foreign substance is squeezed firmly between the same and may result in breaking or stopping the disks. To obviate this I provide the drag bar with a support $d^9$, to which is secured a shield $d^{10}$, which extends downwardly in front of said disks and protects the opening between the same down to or substantially opposite the point at which the disks meet each other. I also connect to said support $d^9$ backwardly-extending scrapers $d^{11}$, which curve outwardly and then inwardly so as to bear against the outer surface of the disks near the outer peripheries thereof, and thus, as the disks revolve, remove therefrom any soil which may adhere thereto.

To provide against lateral movement of the disks with reference to each other, which would result in changing the distance between the rows planted thereby, I preferably employ connecting links $h$ (Fig. 12) which are perforated at each end to receive the bars $e^{21}$ connected to the hangers $e^{23}$. These bars are adapted at their respective ends to overlap as shown in Fig. 12, and when placed in position hold the supporting heads $e$ against lateral movement with reference to each other.

In Figs. 6 and 9 I have shown a modified form of covering device, which consists essentially of two bars $k$ $k'$ hinged to the supporting head and extended backwardly and thence outwardly and inwardly, one of said bars being formed slightly shorter than the other. A covering device as thus described is adapted to draw the earth inwardly toward the furrow, while the different lengths of bars permit the outer ends to be brought within a short distance of the center line of the furrow and still leave a considerable opening between the same to permit trash or field débris to pass through.

Having thus described my invention, I claim—

1. In a seeding machine, a furrow opener consisting essentially of a support having angularly-arranged trunnions, disks journaled at each side of said support on said trunnions so that the cutting edges thereof are made to approach each other at the front and below the center of rotation, as described, whereby an opening between said disks of decreasing size in the direction of the rotation thereof is produced above the ground line of the furrow opener, and a guard or shield arranged in front of said disks so as to protect said opening, substantially as specified.

2. In a seeding machine, a furrow opener consisting essentially of a support having angularly-arranged disks journaled thereon with the point of nearest approach of said disks at the front of and below the center of rotation thereof, a drag bar connected to said support and extending forwardly therefrom, and a projecting shield or guard secured to said drag bar so as to protect the opening between said disks which is above the point of nearest approach between the said disks, substantially as specified.

3. A furrow opener consisting essentially of a support having a conduit therein, and angularly-arranged trunnions on each side of said support formed integral therewith, rotating disks supported on said trunnions, said support being formed with an opening which extends entirely through the same and through said trunnions, and a bent rod or bolt extending through said opening and provided at each end with fastening devices for retaining said disks in position on said trunnions, substantially as specified.

4. In a furrow opener, a support having a conduit, and an upwardly-extending arm or trunnion, a backwardly-extending gage or covering device hinged to said support, a connecting rod from said arm to said extended portion, and a spring on said connecting rod, substantially as specified.

5. In a seeding machine, a furrow opener consisting of a support, and rotary disks journaled at an angle to each other on said support, a drag bar connected to said support and backwardly-extending scraper connected to said drag bar and adapted to engage on said disks, substantially as specified.

6. The combination with a disk furrow opener consisting of a support and disks journaled at an angle to each other on said support, a conduit in said support having inwardly projecting trunnions, of a sleeve formed of sheet metal having openings adapted to be forced over said trunnions and thus become pivoted in said conduit, substantially as specified.

7. The combination with a support having angularly arranged trunnions thereon, an opening extending through said support and through said trunnions, disks journaled on said trunnions, a connecting bolt extending through said support and through said trunnions and provided with means to secure said disks on said trunnions, said bolt being provided with projecting ends which extend beyond said disks, and a hanger carrying a covering device pivoted on said extended portions, substantially as specified.

8. The combination with a furrow opener, of a covering or pressing device consisting essentially of a supporting head having angularly-arranged trunnions, and wheels on said trunnions, said head being detachable and reversible so as to bring said wheels immediately over or removed from the furrow, substantially as specified.

9. The combination of a furrow opener, of a hanger connected thereto, a supporting head detachably connected to said hanger, said head having angularly-arranged trunnions with wheels thereon, and means, as described, for detaching and reversing said head to change the position of said wheels with reference to the furrow, substantially as specified.

10. In a seeding machine, a covering device consisting essentially of a hanger having a reversible supporting head with angularly-arranged trunnions, and conical-shaped wheels on said trunnions, said head being adapted to be removed and reversed so as to change the angular position of said wheels with reference to the furrow, substantially as specified.

11. The combination with a support having a conduit, and disks journaled at an angle thereon, a hanger pivoted to said support at the center of said disks, said hanger being extended backwardly and provided with a detachable and reversible head having angularly-arranged wheels thereon, an upwardly and backwardly extending arm on said support, and a connection between said arm and said hanger, a spring also arranged between said arm and hanger, and means for adjusting said connection, substantially as specified.

12. A furrow opener consisting essentially of a support having disks journaled at an angle thereon, and a conduit in said support, a projecting arm extending upwardly and rearwardly from said conduit, and a hanger pivoted to said support, a connection from said hanger to said extending arm, said connection being provided with perforations at a distance apart equal to the thickness of said arm, and means, as described, for attaching said connection to said arm so as to form a rigid or loose connection as desired, substantially as specified.

13. The combination with a furrow opener, of a hanger pivoted thereto, and a backwardly-extending perforated arm formed on said furrow opener above said hanger, a connecting rod from said hanger extending through said perforated arm, and a series of openings in said connecting rod, said openings being arranged at a distance apart substantially equal to the thickness of said arm through which the rod extends, and pins or projections adapted to engage in said openings so as to attach said arm rigidly or loosely to said connecting device, substantially as specified.

14. In a furrow opener, a support having a conduit therein and having oppositely-arranged trunnions on which are journaled disks, as described, said trunnions being arranged at an angle to each other and to the support so as to cause said disks at their peripheries to meet at a point below and in front of the center of said trunnions, and a guard or shield arranged in front of said disks so as to protect the opening between said disks above the meeting point thereof, substantially as specified.

In testimony whereof I have hereunto set my hand this 3d day of April, A. D. 1894.

FRANK R. PACKHAM.

Witnesses:
ROBERT C. RODGERS,
RICHARD H. RODGERS.